United States Patent
Moyer et al.

(10) Patent No.: US 6,322,702 B1
(45) Date of Patent: Nov. 27, 2001

(54) SOLVENT AND PROCESS FOR RECOVERY OF HYDROXIDE FROM AQUEOUS MIXTURES

(75) Inventors: Bruce A. Moyer, Oak Ridge, TN (US); C. Kevin Chambliss, Macon, GA (US); Peter V. Bonnesen, Knoxville; Tamara J. Keever, Oak Ridge, both of TN (US)

(73) Assignee: U.T. Battlle, LLC, Oak Ridge, TN (US)

( * ) Notice: Subject to any disclaimer, the term of this patent is extended or adjusted under 35 U.S.C. 154(b) by 0 days.

(21) Appl. No.: 09/404,104

(22) Filed: Sep. 23, 1999

(51) Int. Cl.[7] ................................................. B01D 11/00
(52) U.S. Cl. ........................ 210/634; 252/364; 510/412
(58) Field of Search ........................ 210/634, 638, 210/639; 423/2, 8, 181; 252/364; 568/700; 510/108, 109, 110, 412

(56) References Cited

U.S. PATENT DOCUMENTS

| | | |
|---|---|---|
| 3,598,547 | 8/1971 | Grinstead . |
| 3,598,548 | 8/1971 | Grinstead . |
| 4,741,831 | 5/1988 | Grinstead ........................ 210/638 |
| 4,828,751 * | 5/1989 | Kremer . |
| 5,236,555 * | 8/1993 | Yuan . |
| 5,281,336 | 1/1994 | Dalton et al. .................... 210/634 |
| 5,356,538 * | 10/1994 | Wai et al. ........................ 210/634 |
| 5,433,855 | 7/1995 | Campbell et al. ............... 210/638 |
| 5,443,731 | 8/1995 | Moyer et al. .................... 210/634 |
| 5,522,997 | 6/1996 | Virnig et al. .................... 210/638 |
| 5,679,175 * | 10/1997 | Hayes et al. . |
| 5,792,357 * | 8/1998 | Wai et al. ........................ 210/638 |
| 5,879,556 | 3/1999 | Hein ................................ 210/634 |
| 6,174,503 * | 1/2001 | Moyer et al. .................... 423/181 |

* cited by examiner

Primary Examiner—Joseph W. Drodge
(74) Attorney, Agent, or Firm—J. Herbert O'Toole; Hardaway/Mann IP Group

(57) ABSTRACT

Hydroxide values and associated alkali metal may be recovered from alkaline aqueous solutions using classes of fluorinated alcohols in a water immiscible solvent. The alcohols are characterized by fluorine substituents which are proximal to the acidic alcohol protons and are located to adjust the acidity of the extractant and the solubility of the extractant in the solvent. A method for stripping the extractant and solvent to regenerate the extractant and purified aqueous hydroxide solution is described.

22 Claims, 5 Drawing Sheets

Class I:

XF$_2$C(CF$_2$)$_m$(CH$_2$)$_n$OH

Where X = H or F; $11 \geq m \geq 5$; and n = 1.

Class II:

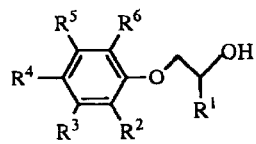

Where R$^1$ = CF$_3$ or CF$_2$CF$_3$ and R$^2$, R$^3$, R$^4$, R$^5$, and R$^6$ are H or alkyl substituents of the type C$_n$H$_{2n+1}$, such that the sum total of carbon atoms causes partitioning of the alcohol and alkoxide form of the compound to the aqueous phase to be negligible.

Class III:

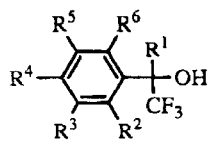

Where R$^1$ = H, C$_n$H$_{2n+1}$ for n = 1-12, or CF$_3$ and R$^2$, R$^3$, R$^4$, R$^5$, and R$^6$ are H or alkyl substituents of the type C$_n$H$_{2n+1}$, such that the sum total of carbon atoms causes partitioning of the alcohol and alkoxide form of the compound to the aqueous phase to be negligible.

Class IV:

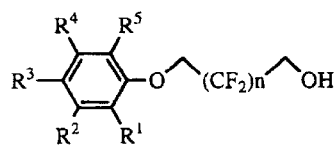

Where n = 2-4 and R$^1$, R$^2$, R$^3$, R$^4$, and R$^5$ are H or alkyl substituents of the type C$_n$H$_{2n+1}$, such that the sum total of carbon atoms causes partitioning of the alcohol and alkoxide form of the compound to the aqueous phase to be negligible.

Fig. 2

Table 1. Extraction and Stripping Results for Recovery of Hydroxide from Aqueous 7.0 M NaOH[a]

| Example | Compound | $[Na^+]_{ext}$, M[b] | $[Na^+]_{strip}$, M[c] | % strip | $[base]_{strip}$, M[d] | $[base]/[Na^+]_{strip}$ |
|---|---|---|---|---|---|---|
| A | $F_3C(CF_2)_7CH_2OH$ | 0.286 | 0.283 | 99% | 0.301 | 1.06 |
| B | $HF_2C(CF_2)_7CH_2OH$ | 0.289 | 0.286 | 99% | 0.298 | 1.03 |
| C | X+⟨C₆H₄⟩-O-CH(CF₃)-CH₂OH | 0.285 | 0.283 | 99% | | |
| D | -⟨C₆H₄⟩-C(CH₃)(CF₃)-OH | 0.179 | 0.179 | 100% | 0.190 | 1.06 |
| E | -⟨C₆H₄⟩-CH(CF₃)-OH | 0.287 | 0.286 | 100% | 0.281 | 0.98 |
| F | -⟨C₆H₄⟩-C(CF₃)₂-OH | 0.400 | 0.386 | 96% | 0.359 | 0.93 |
| G | X+⟨C₆H₄⟩-OH | 0.314 | 0.256 | 82% | 0.264 | 1.03 |
| H | $H_3C-C(C_{12}H_{25})_2-COOH$ | 0.302 | 0.119 | 32% | 0.105 | 0.88 |
| I | $F_3C(CF_2)_5(CH_2)_3OH$ | 0.058 | 0.058 | 100% | | |
| J | X+⟨C₆H₄⟩-O-CH(OCF₂CF₂H)-CH₂OH | 0.086 | 0.086 | 100% | 0.088 | 1.02 |
| K | X+⟨C₆H₄⟩-(OCH₂CH₂)ₙOH (n = 1.4 avg) | 0.087 | 0.087 | 100% | 0.087 | 1.00 |
| | 1-octanol blank | 0.050 | 0.050 | 100% | 0.056 | 1.12 |

[a]See Example 1 text for experimental details. [b]$[Na^+]_{ext}$ is the equilibrium concentration of sodium in the organic phase following extraction. [c]$[Na^+]_{strip}$ is the equilibrium concentration of sodium in the aqueous strip phase. [d]$[base]_{strip}$ is the equilibrium concentration of titratable base in the aqueous strip phase and corresponds to the concentration of hydroxide ion, provided that partitioning of the anionic form of the extractant to the aqueous phase is negligible.

Fig. 7

SOLVENT AND PROCESS FOR RECOVERY OF HYDROXIDE FROM AQUEOUS MIXTURES

This application is related to U.S. patent application Ser. No. 09/146,800, filed Sep. 3, 1998 now U.S. Pat. 6,174,503.

This invention was made with U.S. Government support under contract number DE-AC05-96OR22464 awarded by the United States Department of Energy to Lockheed Martin Energy Research Corporation, and the U.S. Government has certain rights in this invention.

BACKGROUND OF THE INVENTION

1. FIELD OF THE INVENTION

This invention is directed to solvent compositions and to a two-step liquid-liquid process for the selective recovery of hydroxide ion from alkaline waste solutions, including solutions that are highly concentrated in salts. The process entails contacting an alkaline aqueous solution containing an alkali metal hydroxide with a solvent containing a fluorinated alcohol extractant dissolved in a water-immiscible organic diluent. Upon contact, alkali metal hydroxide equivalents are effectively extracted into the solvent phase. Alkali metal hydroxide is subsequently recovered from the solvent by contacting the metal-containing organic phase with an aqueous stripping solution. The stripping process also regenerates the solvent for use in subsequent extraction-stripping cycles. Extractant acidity can be fine-tuned by strategic substitution of electron donating and/or electron withdrawing groups in the backbone chain of alkyl and arylalkyl fluorinated alcohol extractants to accommodate a variety of aqueous pH conditions.

2. DESCRIPTION OF THE PRIOR ART

The ability to recover hydroxide from an aqueous mixture is a potentially useful technology for treatment of caustic industrial process streams. Caustic process streams are common in a multitude of industrial manufacturing and research facilities. In many cases, these waste streams are neutralized with acid prior to disposal in a landfill. In the nuclear industry, treatment is not quite as simple.

Much DOE research has been aimed at the removal of radioactive constituents of high-level alkaline tank waste. At Hanford, Washington and other sites, a need has arisen to remove bulk constituents that would otherwise have to be vitrified in the resultant low-level waste (LLW) stream. Such a need was recently identified on the world-wide web site of the DOE Office of Environmental Management Tanks Focus Area (Technology Needs/Opportunities No. RL-WT008). This need is easily understood. For example, if the estimated $6.8 \times 10^7$ kg of sodium inventory of Hanford tanks is vitrified in the low-level borosilicate glass, each glass canister having a mass of 1650 kg and containing 15% sodium, then one expects a production of 280,000 glass canisters. If these are produced at five hundred thousand dollars per canister, then the low-level vitrification alone will cost one hundred forty billion dollars. A technical approach to decreasing the cost of the LLW vitrification would be to cleanly separate the major sodium salts from the waste. Perhaps the most obvious case for recycle is sodium hydroxide, a chemical which is needed for tank sludge washing and waste retrieval. Without such recycle, the needed sodium hydroxide would have to be purchased and added to the waste stream, ultimately increasing the waste volume and worsening the overall problem. It is estimated that 32% of the sodium in the Hanford tanks could be recovered as sodium hydroxide, half of which is needed for recycling. It is important to point out that the sodium hydroxide treatment step typically would follow the fission product (i.e., Cs-137, Sr-90, Tc-99) separation steps. Thus, long-term radiolytic stability of the solvents used for hydroxide recovery is not expected to be a significant issue.

It is also anticipated that private industries not associated with radioactive waste issues would be interested in use of the present invention. Caustic process streams are common in many of industrial manufacturing and research facilities including paper manufacturing and aluminum production. In many cases, these waste streams are neutralized with acid prior to disposal in a landfill. The present invention potentially provides a cost effective strategy to treat alkaline waste streams and recover sodium hydroxide. The recovered product could then be recycled for use in commercial applications. Also, if recovery of sodium hydroxide decreases the pH of the aqueous feed below 12.5, the waste stream would no longer be considered hazardous under the EPA corrosivity classification D002 of the Resource Conservation and Recovery Act and disposal costs would be expected to decrease accordingly.

The present invention (i.e., the liquid-liquid extraction and recovery process) represents a potentially improved strategy, with respect to the prior art, for recovery of hydroxide from a caustic aqueous salt mixture. By reference to the hydrometallurgical industry, solvent extraction is generally recognized as providing economical, selective, high-throughput methodology and is widely practiced for a variety of separations. By analogy, the process presented here is expected to offer these same potential advantages. Experience with employing solvent extraction in the nuclear industry has also been extensive and productive. The use of solvent extraction for nuclear applications has lain overwhelmingly on the acid side, while applications for alkaline-side separations have only recently been considered. Nevertheless, in the case of technetium separation from alkaline tank waste, recent work has set the precedent that efficient, cost-effective processes are not only feasible and demonstrable by solvent extraction, but also highly selective (U.S. Pat. No. 5,443,731).

An ideal liquid-liquid extraction process would require no prior adjustment of the waste stream, consume no chemicals, and add no additional chemical substances to either the exiting depleted waste or alkali metal product streams. Use of water for stripping is highly compatible with such a process, necessitating extractants that release alkali metal hydroxide upon contact with water. With the possible exception of simple evaporation, no further separation steps would be needed to allow subsequent use of the hydroxide-containing product. Hence, extractant systems that are particularly attractive must afford appreciable loading directly from the aqueous feed, effective stripping with water, and adequate selectivity for hydroxide. (The meaning of "adequate selectivity" naturally depends on the anticipated use of the product.) It is important to point out that practical extraction systems must ultimately possess other characteristics such as good phase disengagement, facile kinetics, negligible partitioning of the extractant to the aqueous phase, resistance to the formation of third phases, and stability toward alkaline conditions.

A liquid-liquid process useful for the selective recovery of hydroxide from an aqueous mixture employing organic solvents containing substituted phenols in combination with one or more extractive additives has been described and constitutes the prior art. In U.S. Pat. Nos. 3,598,547 and 3,598,548, Grinstead teaches the use of phenols for the selective liquid-liquid extraction of sodium and potassium from aqueous solutions having a pH of approximately 14. The solvent in this process is comprised of a substituted phenol and an extractive additive containing one or more polar groups (e.g., hydroxyl, oxy, amino, or cyano) dissolved in a hydrocarbon diluent. When this solvent is contacted with an aqueous solution of sodium or potassium values having a pH greater than ca. 12, the sodium or potassium values are extracted into the solvent phase. Following extraction, the loaded organic phase is stripped with water to yield an aqueous solution containing predominantly sodium or potassium hydroxide. However, widespread use of phenols in this capacity is somewhat limited due to the fact that they are slowly decomposed under strongly alkaline conditions. Also, the properties of these compounds result in recovery of sodium and potassium hydroxide in a single contact with pure water that is less than quantitative. In the present invention, organic solvents containing fluorinated alcohol extractants in place of phenols are employed in an analogous liquid-liquid process. As described in detail below, these fluorinated extractants offer some distinct advantages over phenols, resulting in an improved process for the recovery of hydroxide from aqueous mixtures.

BRIEF DESCRIPTION OF THE INVENTION

The object of the present invention is to provide a composition and process offering some distinct advantages over the prior art for the selective removal of hydroxide equivalents from alkaline waste solutions, including waste solutions having a high salt concentration. It is further an object of this invention to provide a process to recover hydroxide values from the extractant to allow recycling of the extractant. This and other objects of the invention may be accomplished by utilizing one or more specially formulated solvents. Alkali metal hydroxide is effectively extracted from the waste solution into a water immiscible solvent phase by contacting a caustic aqueous waste solution with an approximately equal volume of organic solvent consisting of a weakly acidic alcohol extractant at a concentration range of about 0.2 to 2.0 M in a water immiscible diluent. Subsequent contact of the organic phase containing extracted alkali metal with an approximately equal volume of an aqueous strip phase affords near quantitative recovery of the extracted hydroxide value in the form of an alkali metal hydroxide in the strip phase and regenerates the solvent for use in ensuing cycles.

BRIEF SUMMARY OF THE DRAWINGS

FIG. 2 illustrates the classes of fluorinated alcohols which are the subject of this invention.

FIG. 3 (b) is a schematic for the preparation of a class of fluoroalcohols using a Grignard reagent.

FIG. 3 (c) is a schematic for the production of a class of fluoroalcohols by the alcoholysis of anhydrides.

FIG. 7 is a Table summarizing extraction and recovery results from examples supporting the invention

DETAILED DESCRIPTION OF THE INVENTION

It is appropriate to briefly discuss the proposed equilibrium process that controls the extraction and recovery of alkali metal hydroxide in order to provide a foundation upon which the most effective extractants and best mode of operation can be understood. The alcohol extractants function as predominantly cation-exchangers when the solvent is contacted with an alkaline solution. This equilibrium process (1) is shown below (overbars represent species confined to the solvent phase):

$$\overline{ROH} + M^+ + OH^- \leftrightarrows \overline{RO^-} + \overline{M^+} + H_2O \tag{1}$$

Figure 1:
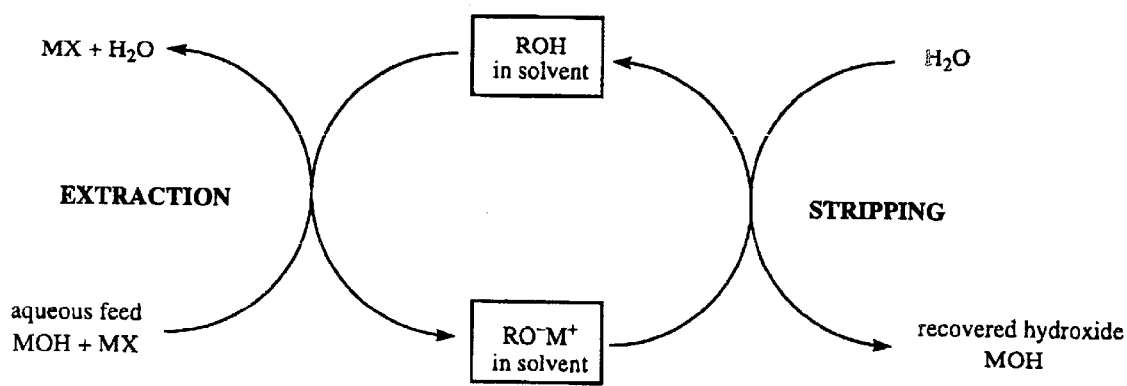
FIG. 1 is a representation of the process for the transfer of a hydroxide value from an alkaline salt mixture to a water stripping agent.

This illustrates how the alcohol is deprotonated in the extraction step and that a proton is transferred to the aqueous phase with concomitant transfer of a charge-compensating metal ion to the organic phase. The proton can subsequently react with OH⁻ to form $H_2O$. This effectively equates to the extraction of metal hydroxide. However, hydroxide ion itself may not necessarily be the major base species in the organic phase; rather the metal alkoxide salt M++Ro− is expected to be the major base species in the organic phase. The reverse reaction shows that the metal ion may be recovered by stripping with water, whereby the alcohol is once again protonated in the organic phase, and the charge-compensating metal ion is recovered in the aqueous phase as the hydroxide. Note that the stripping step also regenerates the solvent. When used in tandem, these steps constitute a cyclic process affording the transfer of alkali metal hydroxide from an aqueous mixture into water as depicted in FIG. 1.

In practice, the contacted aqueous feed would still contain some residual hydroxide, which has been omitted for clarity. In the figure, MOH and MX represent alkali metal hydroxide and alkali metal salt with generic anion X⁻, respectively. ROH and RO⁻M⁺ represent the protonated and alkali metal alkoxide forms of alcohol in the solvent, respectively.

Accordingly, a number of lipophilic reagents possessing an ionizable proton are expected to be useful as extractants in a liquid-liquid process for hydroxide recovery, provided that the acidity of the extractant ROH is appropriately balanced to give efficient extraction yet react with water on stripping to give back NaOH to the stripping solution. The degree of deprotonation in the extraction step, and thus the amount of alkali metal extracted into the solvent phase, depends on the acidity of the ionizable extractant in the solvent and on the pH and salt content of the aqueous feed solution. Specifically, decreasing pH in the aqueous feed requires utilization of a more acidic extractant in order for the extraction process to be efficient. Similarly, recovery of the metal as the hydroxide salt on stripping requires that the extractant possess sufficient acidity to facilitate its protonation at desired alkaline pH values. An additional requirement is that partitioning of both neutral and anionic forms of the extractant to the aqueous phase should be negligible. These requirements limit the use of reagents to those whose functional groups possess a pKa in the solvent phase greater than ca. 8 or 9 and less than ca. 14 and having a partition ratio greater than $10^3$ for the distribution between the solvent and aqueous phases of interest.

Figure 3A:
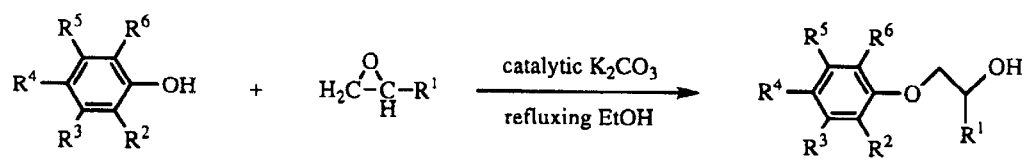
FIG. 3 (a) is a schematic for the preparation of a class of fluoroalcohols by alcoholysis of epoxides.
Figure 3B:
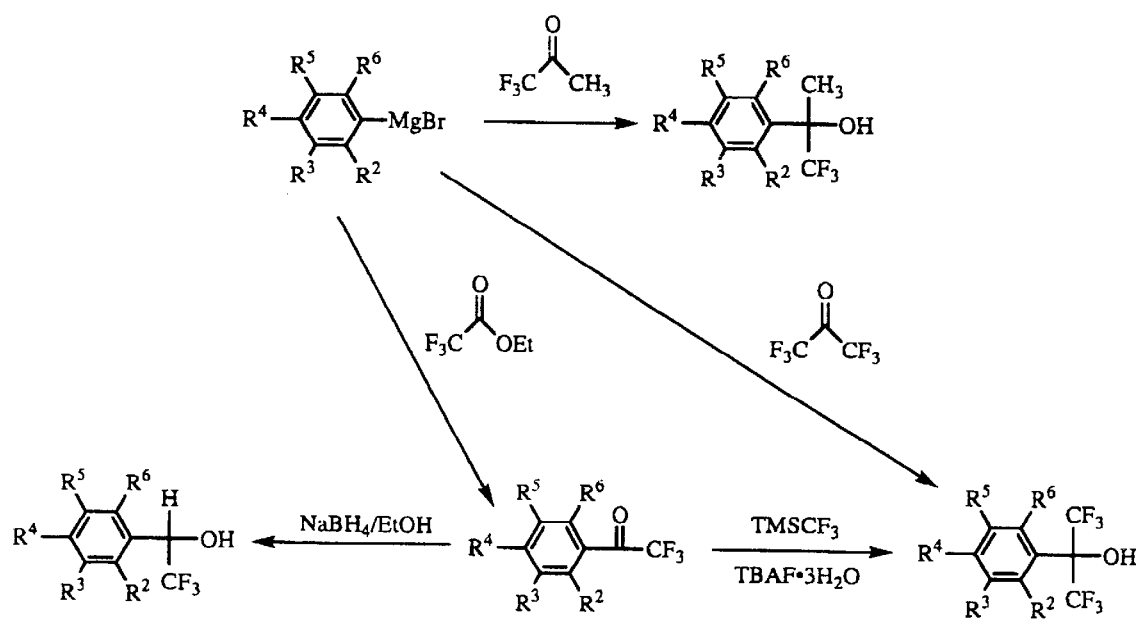
Figure 3C:
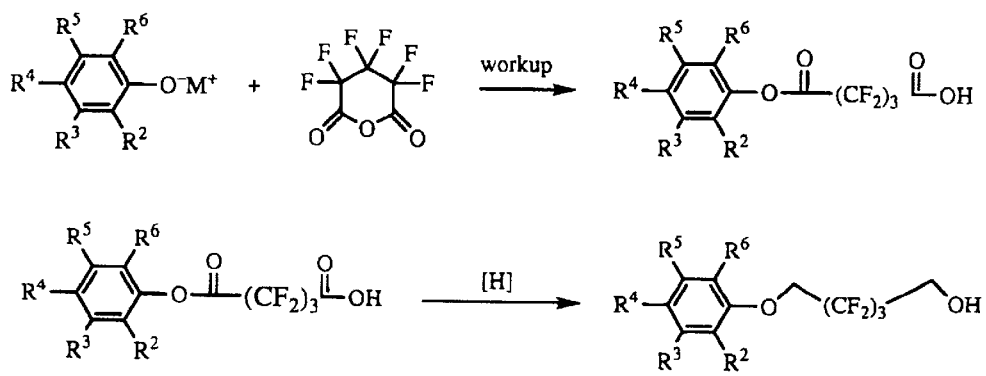

Certain fluorinated alcohols possess ideal $pK_a$ values for use in the recovery of hydroxide from alkaline feed solutions having a pH greater than ca. 13. Fluorinated extractants presently identified as useful for the recovery of alkali metal hydroxide include linear, alkylaryl ether, and alkylbenzyl alcohols containing strategically placed fluorine substituents. Moreover, the $pK_a$ value of these alcohols can be fine-tuned by strategic placement of electron donating and/ or electron withdrawing groups so that extraction and stripping can be favored or disfavored at a variety of aqueous phase compositions from, for example, pure water to 7.0 M NaOH. The general structures of each class of extractant are illustrated in FIG. 2. Known chemistries providing convenient synthetic routes to potentially useful compounds possessing a single ionizable proton are shown in FIG. 3, parts (a), (b), and (c). It is also important to point out that useful extractants may contain more than one ionizable group. For example, the structure (2) shown below represents a Class III compound, where $R^4$ is also a fluorinated benzylic alcohol group. Hence, bifunctional versions of Class I-V extractants can also be

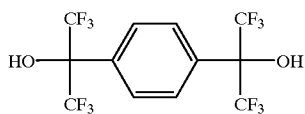

(2)

envisioned and may be useful in certain applications. Note that polymers containing pendant fluorinated alcohol groups may represent examples of polyfunctional extractants A potential advantage of this type of structural variation may be increased hydroxide uptake per mole of extractant. However, each additional ionizable group is known to result in increased solubility of the ionized form of the compound in the aqueous phase. Thus, partitioning is expected to be increasingly important and must be compensated by a greater number of lipophilic carbon atoms in the structure of these compounds if they are to be employed in a liquid-liquid process.

Figure 4:
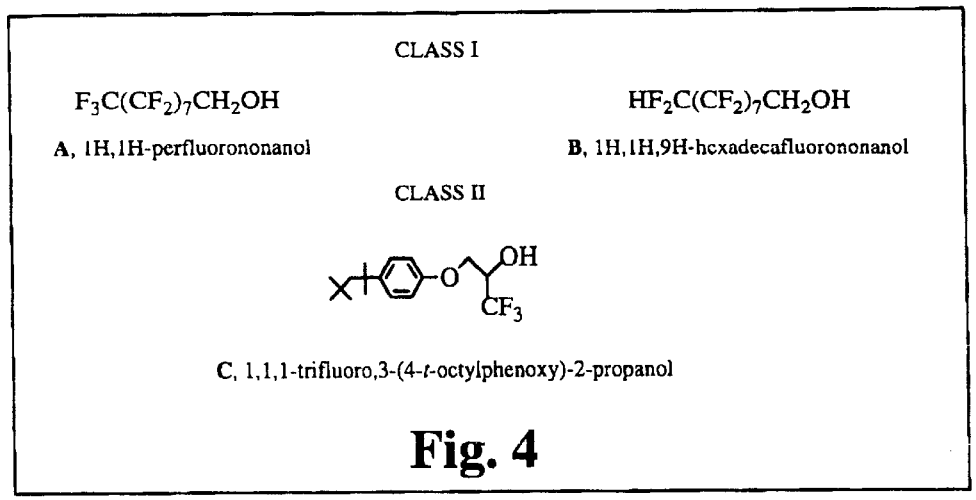
FIG. 4 presents the structures of representative examples of two classes of the fluoroalcohols of this invention.
Figure 5:
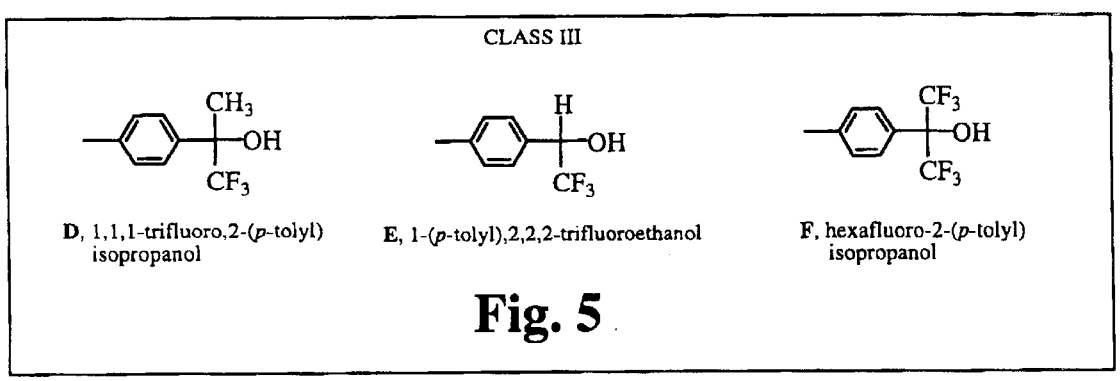
FIG. 5 presents the structures of representative examples of a third class of fluoroalcohols of this invention.
Figure 6:
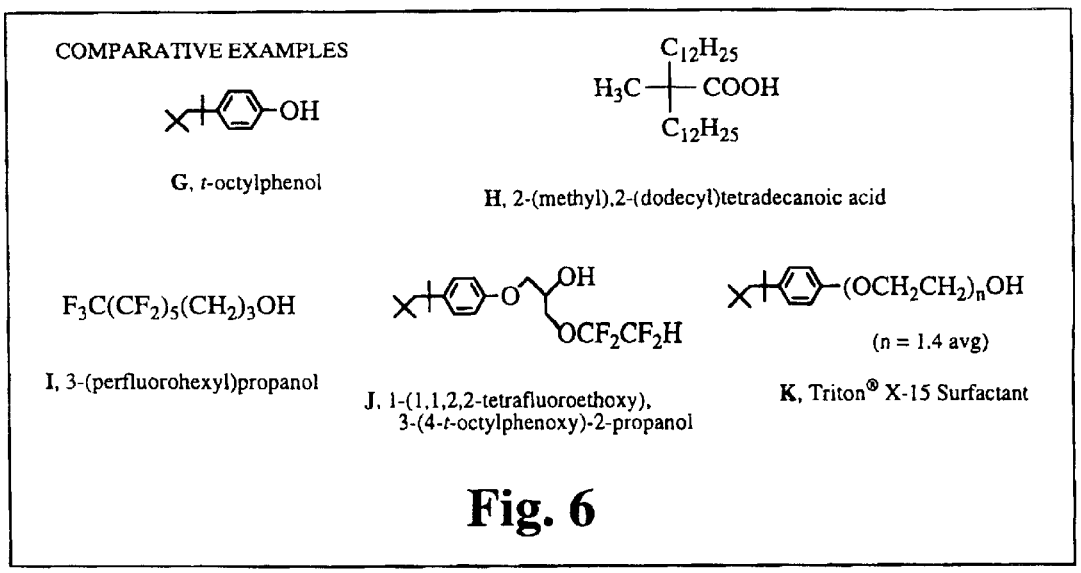
FIG. 6 presents the structures of comparative examples of alcohols outside the scope of this invention.

Representative examples of potentially useful extractants were employed in experimental work demonstrating the new liquid-liquid process along with several structurally similar compounds for comparative purposes. These are illustrated in FIGS. 4 and 5. All compounds used in experimental work were either purchased from commercial vendors or prepared using known procedures (FIG. 3).

It is not a requirement that the aqueous feed solution and solvent volumes nor the aqueous strip solution and solvent volumes be equal. In fact, it may be desirable to employ a larger volume of solvent (i.e., feed to solvent ratio less than 1) when extracting alkali metal hydroxide from an aqueous feed in order to decrease the number of stages required for obtaining a desired degree of removal of hydroxide from the feed. Likewise, it may also be desirable to employ a smaller volume of aqueous stripping solution (i.e., strip solution to solvent ratio less than 1) during the recovery step in order to increase the concentration of hydroxide in the strip phase.

The solvent for use as the immiscible extractant phase should be essentially immiscible in water and must suitably solvate the extractant in both its acid and alkoxide forms. Organic alcohols have been found to be suitable. Typically, linear and branched aliphatic alcohols are useful provided that the hydrocarbon chain contains at least five carbon atoms. Primary and secondary alcohols of the composition $C_nH_{2n+1}$—OH and mixtures thereof are suitable. When the alcohol is linear, n is chosen between 5 and 10, for operations conducted at or about room temperature (ca. 25 degrees C). For operations conducted on alkaline streams at temperatures higher than room temperature, n may be 11 or higher, provided the operating temperature is sufficiently above the melting point of the alcohol so that satisfactory liquid-liquid contacting procedures can be conducted. When branched, n may be between 5 and 13. Examples of linear alcohols are 1-pentanol, 1-hexanol, 1-octanol, 2-octanol, 3-octanol, and 1-decanol. Examples of branched alcohols are isopentyl alcohol, iso-octyl alcohol, isononyl alcohol, 2-ethyl-1-hexanol, iso-decanol, iso-tridecanol, and commercial blends such as EXXAL® 8, 9, 10, 12, and 13 (EXXON CHEMICAL CO.). In our studies, we have found 1-octanol to be particularly suitable because it possesses a useful balance of good solvation properties with very low solubility in aqueous solutions at room temperature. We have also found that hydroxide extraction may be enhanced by the use of certain alcohols such as 1-octanol with some fluoroalcohol extractants, which appear to work synergistically.

It is not a requirement that the organic solvent be composed purely of an organic alcohol. The organic alcohol can be diluted with any amount of a water-immiscible linear or branched alkane; however, the amount of alkane added should not be so much that the solubility of the extractant components (such as the fluorinated alcohol in both the acid and metal alkoxide forms) is exceeded. Suitable linear and branched alkanes containing 8 to 16 carbons include both pure substances such as iso-octane, 1-decane, 1-dodecane, and commercially-available blends such as Norpar® 12, Norpar® 13, Isopar® K, Isopar® L, and Isopar® M, and de-aromatized aliphatics such as Exxsol® D-60, and Exxsol® D-80 and D-110 (all EXXON CHEMICAL CO.). Advantages of using mixtures of alkanes with aliphatic alcohols include reduced viscosity of the organic solution, and potentially improved stripping. An example of the use of a blend of 1-octanol and Isopar® L is provided in Example 4.

Another embodiment of this invention involves the use of a macrocyclic ionophore (such as a crown ether, calixarene-crown ether, or cryptand) in combination with the fluorinated alcohol. A macrocycle can be chosen which has a high selectivity for a particular metal ion over others within a mixture of metal ions in the aqueous alkaline solution. An example of such a macrocycle would be the calixarene crown ether calix[4]arene-bis(tert-octylbenzo-crown-6) which was disclosed in U.S. patent application Ser. No. 09/146,800, now U.S. Pat. No. 6,174,503, for the selective removal of cesium ion values from alkaline mixtures containing cesium and other alkali metal ions such as sodium and potassium. This calixarene-crown ether possesses a high selectivity for cesium over the alkali metal ions lithium, sodium and potassium. An organic solution containing an equimolar mixture of a fluorinated alcohol and this calixarene-crown ether could be used to selectively recover hydroxide values as predominantly the cesium salt cesium hydroxide (CsOH). In applications where it would be desirable to recover the hydroxide as a particular metal ion hydroxide, the appropriate macrocyclic ionophore possessing a high selectivity for the target metal ion could be employed in combination with the fluorinated alcohol. Toward maximizing selectivity and extraction efficiency for the metal ion complexed by the macrocycle, the concentrations of the macrocyclic ionophore and the fluorinated alcohol may be adjusted according to the conditions and requirements of metal hydroxide recovery. In many cases, the macrocycle:fluorinated alcohol mole ratio should be set equal to 1:Q, where Q is the charge on the metal ion. Thus, recovery of for example CsOH would require equal concentrations of macrocycle and fluorinated alcohol. The presence of excess fluorinated alcohol would be expected in many cases to give rise to the non-selective extractive recovery of metal hydroxides. However, other applications exist where it would be desirable to have the concentration ratio of the macrocycle to the fluorinated alcohol be a value other than 1:Q.

A further embodiment of this invention is the use of alternative aqueous solutions instead of distilled water to effect stripping. Although water is the ideal stripping solution to maximize stripping efficiency, other reasons may make it preferable to use dilute solutions of acids, salts, or bases. For example, it may be found that phase coalescence in a particular application is faster when acids, salts, or bases are added at low concentrations, preferably less than 0.1 M. It has been found for other applications of solvent extraction that phase coalescence is usually faster when the aqueous phase contains greater than 0.001 M of an electrolyte. Another reason for employing an aqueous solution of acids, salts, or bases for stripping is simply its availability within a plant environment and the desire to recycle all aqueous streams. Still another reason for employing an aqueous solution of acids, salts, or bases for stripping is that the present invention could be used to boost the concentration of existing alkali metal hydroxide solutions. A reason for employing a slightly acidic strip feed solution (pH>2-4) would be when the extraction feed solution must be brought to near neutral pH in the extraction stages. In all of these cases, the requirement for efficient stripping is that the acid, salt, or base concentration not be too high, as the presence of alkali metal or hydroxide in the stripping solution will lower the driving force by mass action in accord with eq. 1.

The extraction and stripping processes are readily scaled to the volume of alkaline feed to be treated. The heat of solution when the extractant and alkaline feed are mixed is negligible due to the low mutual solubilities. The primary source of heat is from neutralization and is easily controlled on the stripping side by simple heat exchanges. Commercial mixers and centrifugal contractors are suitable for industrial scale operations.

EXAMPLE 1

Experiments were performed with compounds A-K as shown in FIG. 7 in order to demonstrate appreciable loading of alkali metal in the solvent phase on extraction and effective stripping with water. In these experiments, equal volumes of solvent containing 0.2 molar extractant in 1-octanol and an aqueous solution containing 7 M NaOH and ca. $10^{-9}$ M $^{22}$Na radioactive tracer were contacted in sealed plastic vials by gentle end-over-end rotation at 25 ±0.5° C. The contact time was 2 hours, to ensure sufficient time for equilibrium to be attained. After contact, the samples were centrifuged at 4000 rpm for 3 minutes to ensure complete phase disengagement. The $^{22}$Na activity in each phase was determined by measuring the activity of the 1022 keV peak using standard gamma counting procedures. An aliquot of the organic phase was then contacted with an equal volume of deionized water to strip the extracted sodium from the organic phase, using the contacting procedure described above. As before, the $^{22}$Na activity in each phase was determined using standard gamma counting procedures. The sodium distribution ratio, defined as the ratio of count rate (corrected for background) in the organic phase to that in the aqueous phase, was used to calculate the equilibrium concentration of sodium in each phase after both extraction and stripping. Parallel experiments were performed with non-radioactive aqueous feed (i.e., the aqueous phase did not contain $^{22}$Na tracer), and the total concentration of base in the aqueous strip solution was determined by titration with 0.1 N HCl. This concentration corresponds to the concentration of OH⁻ in the strip solution, provided that partitioning of sodium alkoxide to the strip phase is negligible. Extraction and stripping results are collectively presented in FIG. 7, and the data are discussed below.

Appreciable recovery of sodium hydroxide into water is observed for all solvents containing compounds A-F. In virtually every case, the equilibrium concentration of sodium in the solvent phase following extraction is greater than expected based on the extraction of one sodium ion per extractant molecule. This observation indicates synergism between the extractants and 1-octanol. In the absence of synergistic effects, the concentration of sodium in a fully-loaded solvent would at most be approximately 0.25 M (i.e, 0.2 M for the extractant plus the amount extracted by 1-octanol alone). Effective stripping is brought about by a single contact of the loaded solvent with an equal volume of water. Moreover, the strip data and the titration data collectively demonstrate essentially quantitative recovery of sodium hydroxide in the aqueous strip solution in all cases, as evidenced by the near-unity values of the ratio [base]/[Na$^+$]$_{strip}$. The quantity [base] is the sum of the aqueous hydroxide and alkoxide concentrations, which would be titrated together; the latter is expected to be minor.

The importance of the proximity of electron-withdrawing fluorine atoms in relation to the ionizable proton in the structure of Class I extractants can be understood by comparing data for compounds A, B, and I. The equilibrium concentration of sodium in the solvent phase following extraction is essentially the same for A and B (0.286 M and 0.289 M respectively). This observation suggests that substitution of a hydrogen for a fluorine at the terminal carbon atom (i.e., HF$_2$C— vs. F$_3$C—) has very little effect on the extraction behavior of this class of compounds. In contrast, a solvent containing linear extractant I shows only marginal extraction of sodium above the amount observed for the 1-octanol diluent alone. Presumably, this is due to the weaker acidity of this compound.

Similarly, the necessity of a strongly electron-withdrawing —CF$_3$ group attached to the alchol alpha carbon in Class II extractants is realized by comparing the extraction data for compounds C, J, and K. The observed concentration of sodium in the solvent phase when compound C is employed as the extractant is 0.285 M. Structurally similar compounds J and K, which do not contain a —CF$_3$ group in proximity to the alcohol functionality, were not very effective at removing sodium from 7.0 M NaOH. Thus, compounds that are structurally similar to C but lack the strategically placed —CF$_3$ group are not expected to be useful in the preferred embodiment of the present invention. Note that the extraction strength of C, as judged by the equilibrium concentration of sodium in the solvent phase, is similar to that observed for A and B above. This observation suggests that the acidity of C, containing an ether linkage and a single —CF$_3$ group in proximity to the ionizable —OH functionality, is comparable to that of highly-fluorinated Class I extractants.

Compounds D, E, and F were chosen in order to demonstrate control of extractant acidity by systematically varying the electron-donating and electron-withdrawing properties of substituent groups in proximity to the ionizable proton in Class III extractants. It is important to point out that partitioning of D, E, and F to the aqueous phase is expected to be significant based on the number of carbon atoms in their representative structures (i.e., the methyl group on the 4-position of the aromatic ring is not sufficiently lipophilic to cause partitioning to be negligible). Thus, these compounds are not preferred structures of Class III extractants. For the same reason, extraction data presented for these compounds should not be directly compared with that obtained with other systems where partitioning is not as significant. Class III compounds with one or more alkyl substituents having a total of 4 to 12 carbon atoms partition negligibly and are preferred. An example is where the alkyl group is tert-octyl. However, partitioning is expected to be similar for D, E, and F, under the conditions of the present experiment, and relative differences in extraction behavior for solvents containing these compounds should be considered informative. The observed trend in extraction strength for solvents containing D, E, and F is consistent with the expected acidity of these compounds (i.e., the effectiveness of a given extractant is expected to increase with increasing acidity). Compound D, containing an electron-withdrawing —$CF_3$ group and an electron-donating methyl group attached to the alpha carbon of the alcohol is expected to be a weaker acid than compound F, containing two electron-withdrawing —$CF_3$ groups. Therefore, D is expected to be a weaker extractant for sodium. Indeed, the observed concentration of sodium in the solvent phase following extraction for compound D (0.179 M) is much lower than that observed for compound F (0.400 M). Moreover, the observed concentration of sodium for compound E (0.287 M) is in between that observed for D and F, as expected since E contains only a single electron-withdrawing $CF_3$ group attached to the alpha carbon of the alcohol. Note that the equilibrium concentration of sodium in the solvent phase following extraction is impressive for compounds E and F, despite the fact that some of the extractant is lost to the aqueous phase on contact. With improved lipophilicity, these sodium values are expected to be even higher. Thus, Class III extractants, with increased lipophilicity, are preferred with regard to the present invention.

The data presented for compound G are provided so that the data for fluorinated alcohol extractants can be compared with the prior art. Phenols posses the highest useful acidity in terms of a preferred extractant for recovery of hydroxide. The data in FIG. 7, Table 1 demonstrate that, although the extraction strength of solvents containing G for sodium is impressive, the overall efficiency for recovery of sodium hydroxide is diminished compared to solvents containing Class I, II, and III extractants. Only 82% of the extracted sodium is recovered as the hydroxide salt under the conditions of the present experiment. In contrast, essentially quantitive recovery of sodium hydroxide is obtained for solvents containing the fluorinated alcohol extractants discussed above. Therefore, solvents containing fluorinated alcohol extractants according to this invention afford an improved process for hydroxide recovery with respect to the prior art.

It is also important to point out that phenols are not expected to possess long term molecular integrity under alkaline and oxidative conditions. For example, Ragimov et. al. have shown that phenols polymerize in the presence of air under alkaline conditions (U.S. Pat. No. 4,396,757). Also, Wollensak has documented air oxidation of alkyl-substituted phenols in the presence of CuCl under alkaline conditions (U.S. Pat. No. 3,625,983). Finally, Kutyrev et. al. describe the preparation of 3,3', 5,5'-tetra-tert-butyl-4,4'-diphenoquinone via air oxidation of 2,6-di-tert-butylphenol in the presence of a phase-transfer catalyst (Russian Patent 1,747,434). Based on these and other documented studies in the scientific literature, it is reasonable to expect that phenols employed as extractants for the recovery of hydroxide will slowly degrade under prolonged contact with metal-containing alkaline solutions (especially in the presence of oxygen or oxidizing agents) to produce materials that i) may no longer be effective extractants and/or ii) may cause emulsions, precipitation, and possibly third phase formation during the extraction or stripping contacts. Therefore, the extensive use of phenols in processes for hydroxide recovery is expected to be significantly limited. In contrast, fluorinated alcohols are much more stable to prolonged contact with base. Thus, they possess a practical lifetime for implementation in an economical liquid-liquid process, despite the fact the initial cost of preparation may be more expensive than phenols.

Finally, the data presented for compound H demonstrate that carboxylic acids are much too acidic to be considered as useful extractants for hydroxide recovery. Only 32% of the extracted sodium is recovered when the loaded solvent is stripped with an equal volume of pure water. Moreover, the appearance of a white precipitate was noted at the interface when solvents containing compound H were contacted with 7.0 M NaOH, demonstrating limited solubility of the sodium carboxylate in 1-octanol.

EXAMPLE 2

In order to evaluate the selectivity of the liquid-liquid process for hydroxide over other competing ions, 1-octanol and solvents containing compounds B and G dissolved in 1-octanol were contacted with an aqueous solution containing 1.75 M NaOH and 5.25 M $NaNO_3$. The contacting and analysis procedures were identical to those described in Example 1. As shown in Table 2, appreciable extraction of sodium was realized for both solvents, as evidenced by the equilibrium concentration of sodium present in the solvent phase following contact, 0.107 M and 0.218 M for solvents containing B and G, respectively. The solvents were stripped by contacting the loaded organic phase with an equal volume of pure water, whereby 100% of the extracted sodium was recovered for 1-octanol and solvents containing B. Only 87% of the extracted sodium was recovered for solvents containing G.

It is important to point out that the concentration of base does not correspond exactly to the concentration of sodium in the aqueous strip solution. This observation suggests that some fraction of extracted sodium is recovered as the nitrate salt. Thus, the acid-base equilibrium given in Equation 1 is not the only operable extraction mechanism. Presumably, a small amount of sodium is also removed by ion-pair extraction, whereby a sodium cation and a charge-compensating anion are simultaneously transferred from the aqueous to the organic phase as an ion pair. This mechanism would favor extraction of the larger nitrate anion over hydroxide. The calculated selectivity ratios, $[OH^-]/[NO_3^-]$ were 12 and 9.0 for solvents containing B and G, respectively, indicating increased hydroxide selectivity for the fluorinated extractant. The observation that this ratio was only 1.3 for 1-octanol alone demonstrates the importance of a proton-ionizable extractant in the solvent.

TABLE 2

Extraction and Stripping Results for Recovery of Hydroxide from Aqueous 1.75 M NaOh, 5.25 M $NaNO_3$.[a]

| Compound | Structure | $[Na^+]_{ext}$, M[b] | $[Na^+]_{strip}$, M[c] | % strip | $[base]_{strip}$, M[d] | $[OH^-]/[NO_3^-]$[e] |
|---|---|---|---|---|---|---|
| B | $HF_2C(CF_2)_7CH_2OH$ | 0.107 | 0.107 | 100% | 0.098 | 12 |
| G | (tert-butyl-substituted phenol with OH) | 0.218 | 0.189 | 87% | 0.170 | 9.0 |
| | 1-octanol blank | 0.007 | 0.007 | 100% | 0.004 | 1.3 |

[a]See Example 2 text for experimental details.
[b]The equilibrium concentration of sodium in the organic phase following extraction.
[c]The equilibrium concentration of sodium in the aqueous strip phase.
[d]The equilibrium concentration of titratable base in the aqueous strip phase corresponding to the concentration of hydroxide ion, provided that partitioning of the anionic form of the extractant to the aqueous phase is negligible.
[e]The selectivity ratio representing the ratio of the amount of recovered hydroxide salt to that of recovered nitrate salt. It is assumed that $[OH^-] = [base]_{strip}$ and $[NO_3^-] = [Na^+]_{strip} - [base]_{strip}$.

EXAMPLE 3

An important aspect of the present invention is the ability to reuse the solvent in subsequent extraction/recovery cycles. This aspect of the liquid-liquid process was not reported in the prior art. In order to demonstrate this principle, experiments were performed using a solvent consisting of 0.2 M compound B in 1-octanol and an aqueous simulant of Hanford tank AW-101 Double-Shell Slurry Feed (DSSF-7). The DSSF-7 simulant contains the following ions at the given concentrations: $Na^+$ (7.00 M), $K^+$ (0.945 M), $Cs^+$ ($7.0\times10^{-5}$ M), $Al^{3+}$ (0.721 M), $OH^-$ (4.63 M, total; 1.75 M, free), $Cl^-$ (0.102 M), $NO_2^-$ (1.51 M), $NO_3^-$ (3.52 M), $SO_4^{2-}$ ($8.0\times10^{-3}$ M), $CO_3^{2-}$ (0.147 M), $PO_4^{3-}$ (0.014 M). The process was tested over four extraction/recovery cycles. Each cycle consisted of contacting the solvent with an equal volume of fresh DSSF-7 simulant containing ca. $1\times10^{-9}$ M $^{22}Na$ tracer and stripping the loaded solvent after each extraction step with an equal volume of deionized water. The two phases were contacted by vortexing for 3 minutes. After contact, the samples were centrifuged at 4000 rpm for 3 minutes to ensure complete phase disengagement. The experimental procedure for stripping the loaded solvent was carried out in the same manner. The concentration of sodium in each phase was monitored after each extraction and stripping step using standard gamma-counting procedures and the determined values were used to calculate the distribution ratio, D(Na), (defined as the equilibrium concentration of sodium in the organic phase divided by that in the aqueous phase) for extraction of sodium from the DSSF-7 simulant. Note that the recovered sodium is assumed to be predominantly present as the hydroxide salt in the aqueous strip solution based on the data given in Example 2. As shown in Table 3, appreciable extraction and quantitative recovery of sodium was observed in each cycle. Moreover, the observation that the distribution ratio is essentially constant demonstrates complete regeneration of the solvent over four cycles. This example also demonstrates the viability of the present invention for recovery of sodium hydroxide over multiple cycles from a real waste simulant. It is also important to point out that this test represents the first documented test of the liquid-liquid process over multiple cycles, as regeneration of the solvent on stripping was not investigated for the related technology involving phenols.

TABLE 3

Extraction and Stripping Results over Multiple Cycles for Recovery of Sodium from DSSF-7 Simulant.[a]

| cycle | D(Na)[b] | $[Na^+]_{extr}$, M[c] | $[Na^+]_{strip}$, M[d] | % strip |
|---|---|---|---|---|
| 1 | $1.79 \times 10^{-2}$ | 0.123 | 0.122 | 99% |
| 2 | $1.77 \times 10^{-2}$ | 0.122 | 0.122 | 100% |
| 3 | $1.77 \times 10^{-2}$ | 0.122 | 0.122 | 100% |
| 4 | $1.74 \times 10^{-2}$ | 0.120 | 0.120 | 100% |

[a]See Example 3 text for experimental details.
[b]The distribution ratio for extraction of sodium from DSSF-7.
[c]The equilibrium concentration of sodium in the solvent phase following extraction.
[d]The equilibrium concentration of sodium in strip phase.

Compounds C, J, and K have been previously investigated as extractive additives for elective separation of cesium from alkaline solutions that are highly concentrated in salts U.S. patent application Ser. No. 09/146,800, Sep. 3, 1998). In this document, enhanced cesium extraction is reported for solvents containing these additives in combination with a calix-arene crown ether, relative to the solvent consisting of only the calix crown dissolved in a hydrocarbon diluent. The compounds appear to serve as solvating compounds that work cooperatively with the calix-arene crown ether to enhance the extraction of cesium.

EXAMPLE 4

Another important aspect of the invention is the ability to dilute the aliphatic alcohol diluent (e.g., 1-octanol) with an aliphatic hydrocarbon (e.g., Isopar* L, a blend of branched alkanes available from Exxon Chemical Co. of ten to twelve carbons) to reduce the overall solution viscosity and improve stripping efficiency. Compound F was dissolved at 0.22 M in a 44:56 (vol/vol) blend of 1-octanol:Isopar® L, and this solvent contacted with the DSSF-7 simulant in the manner described in Example 3. The solvent was then stripped with distilled water. The results showed a sodium distribution ratio, D(Na) of 0.0457, with $[Na^+]_{extr.}$ of 0.305 M and $[Na^+]_{strip}$ of 0.304 M (>99% stripping efficiency). Comparatively, a solution of F dissolved in neat 1-octanol at 0.20 M afforded a D(Na) of 0.0419, with $[Na^+]_{extr.}$ of 0.281 M and $[Na^+]_{strip}$ of 0.274 M (98% stripping efficiency). (The sodium extraction results scaled with the concentration of F.) Thus, this example illustrates the principal that dilution of the aliphatic alcohol diluent (here 1-octanol) with a branched alkane diluent such as Isopar® L does not hinder the sodium hydroxide extraction and stripping performance, but in fact may offer some enhancement in the stripping efficiency.

These examples above are for purposes of illustration only and are not limiting of the invention. Modifications obvious to one skilled in the art are included within the scope of this invention, which is defined by the claims.

What is claimed is:

1. A method for the removal of hydroxide values from a mixed aqueous alkaline solution comprising the steps of:
   a) preparing a water-immiscible organic solution comprising an organic solvent having dissolved therein one or more fluorinated alcohols;
   b) contacting said water-immiscible organic solution with the mixed aqueous alkaline solution for a time period sufficient for a reaction to take place between the fluorinated alcohol and the hydroxide values to form an essentially hydroxide-depleted aqueous phase and a fluorinated alkoxide-containing organic recovery phase;
   c) separating the organic recovery phase from the hydroxide-depleted aqueous phase, thereby removing hydroxide values from said aqueous alkaline solution.

2. A method according to claim 1 wherein the fluorinated alcohol is selected from the group consisting of:

5. A method according to claim 4 wherein said alcohol is a linear alcohol having between 5 and 10 carbon atoms.

6. A method according to claim 5 wherein said alcohol is selected from the group consisting of 1-octanol, 2-octanol, and 1-decanol.

7. A method according to claim 6 wherein the linear alcohol is 1-octanol.

8. A method according to claim 4 wherein said alcohol is a branched alcohol having between 5 and 13 carbon atoms.

9. A method according to claim 8 wherein said branched alcohol is selected from the group consisting of iso-octyl alcohol, iso-nonylalcohol, iso-decanol, iso-tridecanol, 2-ethyl-1-hexanol, and blends thereof.

10. A method according to claim 4 wherein said organic solvent further comprises a linear or branched alkane having between 8 and 16 carbon atoms, and mixtures thereof.

11. A method according to claim 1 further comprising contacting the organic recovery phase with an aqueous stripping solution, wherein at least a portion of the fluorinated alkoxide in the organic recovery phase is converted back to the fluorinated alcohol.

12. A method according to claim 1 further comprising a cation-specific extractant which is a macrocyclic ionophore.

Class I:
$XF_2C(CF_2)_m(CH_2)_nOH$

Where X = H or F; $11 \geq m \geq 5$; and n = 1.

Class II:

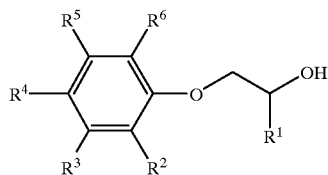

Where $R^1 = CF_3$ or $CF_2CF_3$ and $R^2$, $R^3$, $R^4$, $R^5$, and $R^6$ are H or alkyl substituents of the type $C_nH_{2n+1}$, such that the sum total of carbon atoms causes partitioning of the alcohol and alkoxide form of the compound to the aqueous phase to be negligible.

Class III:

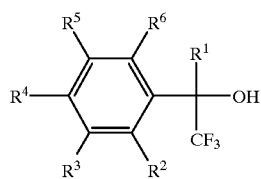

Where $R^1$ = H, $C_nH_{2n+1}$ for n = 1–12, or $CF_3$ and $R^2$, $R^3$, $R^4$, $R^5$, and $R^6$ are H or alkyl substituents of the type $C_nH_{2n+1}$, such that the sum total of carbon atoms causes partitioning of the alcohol and alkoxide form of the compound to the aqueous phase to be negligible.

Class IV:

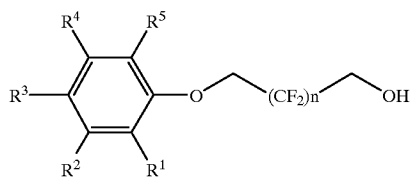

Where n = 2–4 and $R^1$, $R^2$, $R^3$, $R^4$, and $R^5$ are H or alkyl substituents of the type $C_nH_{2n+1}$, such that the sum total of carbon atoms causes partitioning of the alcohol and alkoxide form of the compound to the aqueous phase to be negligible.

3. A method according to claim 2 wherein said fluorinated alcohol is selected from the group consisting of 1 H, 1 H,9H-hexadecafluorononanol, 1,1,1 -trifluoro, 3-(4-tert-octylphenoxy)-2-propanol, and hexafluoro-2-(4-tert-octylphenyl)-isopropanol.

4. A method according to claim I wherein said organic solvent comprises at least one alcohol selected from the group consisting aliphatic primary and branched alcohols having between 5 and 16 carbon atoms, and mixtures thereof.

13. A method according to claim 12 wherein said macrocyclic ionophore is selected from the group consisting of crown ethers, calixarene-crown ethers and cryptand.

14. An organic solution for the removal of hydroxide values from an aqueous alkaline solution comprising a fluorinated alcohol in an organic solvent wherein the fluorinated alcohol is selected from the group consisting of:

Class I:
XF$_2$C(CF$_2$)$_m$(CH$_2$)$_n$OH

Where X = H or F; 11 ≥ m ≥ 5; and n = 1;

Class II:

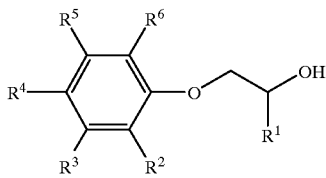

Where R$^1$ = CF$_3$ or CF$_2$CF$_3$ and R$^2$, R$^3$, R$^4$, R$^5$, and R$^6$ are H or alkyl substituents of the type C$_n$H$_{2n+1}$, such that the sum total of carbon atoms causes partitioning of the alcohol and alkoxide form of the compound to the aqueous phase to be negligible;

Class III:

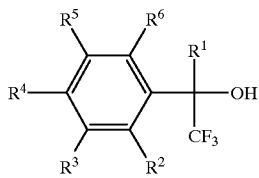

Where R$^1$ = H, C$_{nH2n+1}$ for n = 1–12, or CF$_3$ and R$^2$, R$^3$, R$^4$, R$^5$, and R$^6$ are H or alkyl substituents of the type C$_n$H$_{2n+1}$, such that the sum total of carbon atoms causes partitioning of the alcohol and alkoxide form of the compound to the aqueous phase to be negligible;

Class IV:

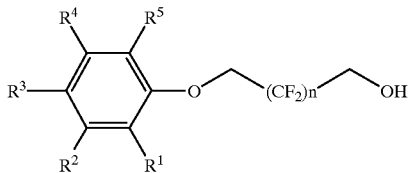

Where n = 2–4 and R$^1$, R$^2$, R$^3$, R$^4$, and R$^5$ are H or alkyl substituents of the type C$_n$H$_{2n+1}$, such that the sum total of carbon atoms causes partitioning of the alcohol and alkoxide form of the compound to the aqueous phase to be negligible.

15. An organic solution according to claim 14 wherein said fluorinated alcohol is selected from the group consisting of:

1H,1H,9H-hexadecafluorononanol, 1,1,1 -trifluoro, 3 -(4-tert-octylphenoxy)-2-propanol, and hexafluoro-2-(4-tert-octylphenyl)-isopropanol.

16. An organic solution for the removal of hydroxide values from an aqueous alkaline solution comprising a fluorinated alcohol in an organic solvent wherein said organic solvent comprises at least one alcohol selected from the group consisting of aliphatic primary and branched alcohols having between 5 and 16 carbon atoms, and mixtures thereof.

17. An organic solution according to claim 16 wherein said alcohol is a linear alcohol having between 5 and 10 carbon atoms.

18. An organic solution according to claim 17 wherein said alcohol is selected from the group consisting of 1-octanol, 2-octanol, and 1-decanol.

19. An organic solution according to claim 17 wherein the linear alcohol is 1 -octanol.

20. An organic solution according to claim 16 wherein said alcohol is a branched alcohol having between 5 and 13 carbon atoms.

21. An organic solution according to claim 20 wherein said branched alcohol is selected from the group consisting of iso-octyl alcohol, iso-nonylalcohol, iso-decanol, iso-tridecanol, 2-ethyl-1-hexanol, and blends thereof.

22. An organic solution according to claim 16 wherein said organic solvent further comprises a linear or branched alkane having between 8 and 16 carbon atoms, and mixtures thereof.

* * * * *